Patented July 25, 1933

1,919,732

UNITED STATES PATENT OFFICE

MORRIS S. KHARASCH, OF CHICAGO, ILLINOIS, ASSIGNOR TO E. I. DU PONT DE NEMOURS & COMPANY, OF WILMINGTON, DELAWARE, A CORPORATION OF DELAWARE

SEED DISINFECTANT COMPOSITION

No Drawing. Application filed November 20, 1929. Serial No. 408,676.

This invention relates to improved disinfectants for the control of diseases of seeds and plants, and more particularly to certain compounds obtained by the action of mercuric salts on organic mono-amino compounds.

It has heretofore been proposed to use organic mercury compounds as seed disinfectants. Such compounds have included mercurized phenolic bodies, mercurized amines in which the mercury is attached to a carbon atom, and alkyl mercuric halides such, for example, as ethyl mercuric chloride.

I have found that excellent seed disinfectants can be prepared from the substituted compounds obtained by the action of mercuric salts on aliphatic amines, particularly the mono-amines, and on certain of the aromatic amines. These compounds as will be apparent are quite different from those that have heretofore been proposed for this purpose.

The compounds I use in my new seed disinfectant composition may be prepared by treating a solution of an aliphatic amine in water, or a suspension of certain amines in water, with a solution of a mercuric salt, preferably mercuric chloride. The type of compound obtained depends upon whether the amine used is primary, secondary or tertiary. All these compounds, however, may be used for my purpose, although I prefer to prepare them from primary aliphatic mono-amines because of their great effectiveness against the diseases of seeds and plants.

In order to illustrate more specifically the effectiveness of compounds of the type of the foregoing, the following examples are presented showing typical compositions suitable for the treatment of seed and plant diseases. It is to be understood, however, that these examples are illustrative merely and that the compounds and proportions may be varied within wide limits.

Example 1

5 parts of the compound formed by treating ethyl amine with mercuric chloride are mixed with 95 parts of diatomaceous earth. The mixture thus obtained will be found well adapted for the treatment of seeds and small grain, for which purpose it can be used satisfactorily in the proportions of 2 or 3 ounces of the disinfectant mixture per bushel of grain.

Example 2

2 parts of the product formed by treating a mixture of butyl amines with mercuric acetate is mixed with 90 parts of finely divided clay, 1 part of charcoal and 7 parts of calcium carbonate. This composition will be found to be an excellent seed disinfectant.

Example 3

7.5 parts of the compound formed by treating iso-amyl-amine with mercuric sulfate are mixed with 2.5 parts of silica-gel, 5 parts of calcium sulfate and 85 parts of bentonite. This mixture can be suspended in water and used as a dip for tubers such as potatoes for the control of disease or it may be diluted further and used as a spray for the control of diseases of foliage and blossoms.

The compounds obtained by treating aliphatic mono amines or a mixture of amines, as shown in the foregoing examples, with mercuric salts possess such a low ionization of the mercury ion that they do not give a precipitate of mercuric oxide when treated with sodium hydroxide. On treatment, however, with a solution of ammonium sulfide they give a black precipitate of HgS.

It is considered that in the substances described above, the mercury is directly attached to the nitrogen atom, giving compounds of the general type R-NH-HgX, where R is an aliphatic hydrocarbon radical and X is an acidic ion such as chloride, bromide, sulfate, acetate, etc.

Example 4

Five parts of product obtained by treating dimethylamine with mercuric chloride are mixed with 90 parts of talc and 5 parts of lime. The mixture thus obtained is well adapted to the treatment of seeds in the proportions of 2 to 6 ounces of the disinfectant composition to each bushel of grain.

Triethyl amine may be substituted for dimethylamine in compositions similar to that shown in Example 4, and will be found to give an effective seed disinfectant.

I may also use in my improved disinfectant composition, compounds obtained by the action of mercuric salts on certain aromatic amines, particularly those which contain substituents in such a position that mercury will not enter the ring attaching itself to a carbon atom, but will rather associate itself with a nitrogen atom, forming what may be termed coordination compounds. In these classes of compounds it is ordinarily found that the mercuric salt combines with the amine to give compounds of the type $RNH_2.HgX_2$, in which R is a substituted aromatic radical which is not readily mercurized, and X is an acidic ion such as chloride, bromide, acetate, etc. Compounds of this type differ from the mercurized aromatic amines in which the mercury is attached to carbon in that they give an instant precipitate of oxide or sulfide with NaOH and $(NH_4)_2S$ respectively.

*Example 5*

1 part of the compound formed by the action of mercuric chloride on p-toluidine is mixed with 95 parts of finely divided clay, 3 parts of infusorial earth and 1 part of iso-propyl-naphthalene-sulfonic acid. This mixture can then be used for the dust treatment of grains or it may be used in suspension in water as a spray for foliage.

The compounds obtained by a similar treatment but with 2-chlor-a-naphthylamine or p-chlor-dimethylaniline may likewise be used.

The compounds covered by my present invention, which, as shown above, differ from the mercurized organic amino compounds previously proposed for use as disinfectants in that the mercury is attached, not to carbon, but rather to nitrogen, I will for convenience call coordination compounds of amines with mercuric salts. Where in the claims I use the term coordination compounds, I refer to compounds as described above, in which the mercury is attached to nitrogen, and which may be distinguished from the mercurized amines previously used for this purpose, in which the mercury is attached to carbon, by the fact that they give an instant precipitate of mercuric sulfide with ammonium sulfide.

The type of diluting materials used is not an essential factor in my invention. Other materials than those mentioned may be used, such for example as talc, sodium sulfate, barium sulfate, etc.

As already disclosed, I may use materials of high absorptive capacity, such as silicagel or activated carbon, in these mixtures, and I may also use wetting and dispersing agents. Furthermore, I may use my preferred disinfectant materials together with other disinfecting agents such, for example, as the organic mercury compounds previously used or proposed, or with copper or arsenic compounds, etc.

I have found, furthermore, that the preparation of these double compounds may be effected by a single step dry process which comprises intimately mixing the amine with the inert ingredients in the absence of any liquid diluent, and thoroughly mixing in the mercuric chloride or other mercuric salt.

For example, diatomaceous earth is placed in a ball mill and amyl amine added, and the two are thoroughly mixed together by rotation of the mill, thus insuring an even distribution of the amine. When this is thoroughly mixed, finely divided mercuric chloride is added in small amount, the agitation being continued 3 to 4 hours after the last addition of mercuric chloride. The material is then in powdered form ready for use. In some cases it may be advisable to mix the amine with a volatile liquid diluent, then carrying on the operation in the manner similar to that shown above. After mixing, the volatile diluent may be allowed to evaporate, thus again leaving a dry powder.

As many apparently widely different embodiments of this invention may be made without departing from the spirit thereof, it is to be understood that I do not limit myself to the foregoing examples or descriptions except as indicated in the following patent claims.

I claim:

1. A seed disinfectant comprising a coordination compound of an organic mono-amine with a mercuric salt.

2. A seed disinfectant comprising the reaction products of a mercuric salt and an aliphatic mono-amine.

3. A seed disinfectant comprising the reaction products of a mercuric salt and a primary aliphatic mono-amine.

4. A seed disinfectant comprising the reaction products of a mercuric salt and butyl amine.

5. The invention of claim 6 in which the mercuric salt is mercuric chloride.

6. A seed disinfectant composition comprising the reaction products of an organic mono-amine and mercuric chloride.

7. A process of making dust-like disinfectant compositions containing mercury, which comprises effecting a reaction by intimate contact between a mercuric salt and an aliphatic amino compound in the absence of a liquid diluent.

8. The process of claim 7 in which the amino compound is an aliphatic amine.

9. The process of claim 7 in which the amino compound is a mono-amine.

10. The process of claim 7 in which the amino compound is a primary mono-amine.

11. The process of claim 7 in which the amino compound is ethyl amine.

12. As a seed disinfectant, a composition comprising a compound having the general formula R-NH-Hg-X, wherein R is an aliphatic hydrocarbon radical and X is an acetic ion.

13. As a seed disinfectant, a composition comprising a compound having the general formula R-NH-Hg-X, wherein R is a substituted aromatic radical not readily mercurized, and X is an acetic ion.

14. As a seed disinfectant, a composition comprising the reaction products of an organic mono-amine and a mercuric salt.

15. The process of disinfecting seeds and plants which comprises treating them with the reaction products of an aliphatic organic amine compound and a mercuric salt in which the mercury is associated with the nitrogen atom.

16. The process of disinfecting seeds and plants which comprises treating them with the reaction products of a solution of an aliphatic organic amine compound and a solution of a mercuric salt in which the mercury is associated with the nitrogen atom.

17. The process of disinfecting seeds and plants which comprises treating them with the reaction products of a solution of an aliphatic organic amine and a solution of mercuric chloride.

18. The process of disinfecting seeds and plants which comprises treating them with the reaction products of an organic mono-amine, a mercuric salt, in combination with a diluent.

19. The process of disinfecting seeds and plants which comprises treating them with a compound having the general formula R-NH-Hg-X, wherein R is an aliphatic hydrocarbon radical and X is an acidic ion.

20. The process of disinfecting seeds and plants which comprises treating them with a compound having the general formula R-NH-Hg-X, wherein R is a substituted aromatic radical not readily mercurized, and X is an acidic ion.

MORRIS S. KHARASCH.

CERTIFICATE OF CORRECTION.

Patent No. 1,919,732.

July 25, 1933.

MORRIS S. KHARASCH.

It is hereby certified that error appears in the printed specification of the above numbered patent requiring correction as follows: Page 2, line 116, claim 5, for the claim number "6" read "4"; and that the said Letters Patent should be read with this correction therein that the same may conform to the record of the case in the Patent Office.

Signed and sealed this 19th day of September, A. D. 1933.

M. J. Moore.

(Seal)

Acting Commissioner of Patents.

10. The process of claim 7 in which the amino compound is a primary mono-amine.

11. The process of claim 7 in which the amino compound is ethyl amine.

12. As a seed disinfectant, a composition comprising a compound having the general formula R-NH-Hg-X, wherein R is an aliphatic hydrocarbon radical and X is an acetic ion.

13. As a seed disinfectant, a composition comprising a compound having the general formula R-NH-Hg-X, wherein R is a substituted aromatic radical not readily mercurized, and X is an acetic ion.

14. As a seed disinfectant, a composition comprising the reaction products of an organic mono-amine and a mercuric salt.

15. The process of disinfecting seeds and plants which comprises treating them with the reaction products of an aliphatic organic amine compound and a mercuric salt in which the mercury is associated with the nitrogen atom.

16. The process of disinfecting seeds and plants which comprises treating them with the reaction products of a solution of an aliphatic organic amine compound and a solution of a mercuric salt in which the mercury is associated with the nitrogen atom.

17. The process of disinfecting seeds and plants which comprises treating them with the reaction products of a solution of an aliphatic organic amine and a solution of mercuric chloride.

18. The process of disinfecting seeds and plants which comprises treating them with the reaction products of an organic mono-amine, a mercuric salt, in combination with a diluent.

19. The process of disinfecting seeds and plants which comprises treating them with a compound having the general formula R-NH-Hg-X, wherein R is an aliphatic hydrocarbon radical and X is an acidic ion.

20. The process of disinfecting seeds and plants which comprises treating them with a compound having the general formula R-NH-Hg-X, wherein R is a substituted aromatic radical not readily mercurized, and X is an acidic ion.

MORRIS S. KHARASCH.

CERTIFICATE OF CORRECTION.

Patent No. 1,919,732.

July 25, 1933.

MORRIS S. KHARASCH.

It is hereby certified that error appears in the printed specification of the above numbered patent requiring correction as follows: Page 2, line 116, claim 5, for the claim number "6" read "4"; and that the said Letters Patent should be read with this correction therein that the same may conform to the record of the case in the Patent Office.

Signed and sealed this 19th day of September, A. D. 1933.

M. J. Moore.

(Seal)

Acting Commissioner of Patents.

CERTIFICATE OF CORRECTION.

Patent No. 1,919,732.　　　　　　　　　　　　　　　　　　July 25, 1933.

MORRIS S. KHARASCH.

It is hereby certified that error appears in the printed specification of the above numbered patent requiring correction as follows: Page 2, line 116, claim 5, for the claim number "6" read "4"; and that the said Letters Patent should be read with this correction therein that the same may conform to the record of the case in the Patent Office.

Signed and sealed this 19th day of September, A. D. 1933.

M. J. Moore.

(Seal)　　　　　　　　　　　　　　　　　　　　Acting Commissioner of Patents.